United States Patent
Tanaka

(10) Patent No.: US 11,983,841 B2
(45) Date of Patent: May 14, 2024

(54) ACHIEVING HIGH-DEFINITION EXPRESSION OF A SURFACE OF AN OBJECT AND REDUCTION OF IMAGE-GENERATION TIME

(71) Applicant: CANON KABUSHIKI KAISHA, Tokyo (JP)

(72) Inventor: Takayuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/506,168

(22) Filed: Oct. 20, 2021

(65) Prior Publication Data

US 2022/0138900 A1  May 5, 2022

(30) Foreign Application Priority Data

Oct. 30, 2020 (JP) ................................ 2020-183117

(51) Int. Cl.
*G06T 3/40* (2006.01)
(52) U.S. Cl.
CPC ...................... *G06T 3/40* (2013.01)
(58) Field of Classification Search
None
See application file for complete search history.

(56) References Cited

U.S. PATENT DOCUMENTS

| | | | | |
|---|---|---|---|---|
| 6,201,542 B1* | 3/2001 | Arai | ......... | G06T 17/20 345/419 |
| 10,121,225 B1* | 11/2018 | Gerges | ......... | G06T 19/00 |
| 11,694,400 B2* | 7/2023 | Delgado | ......... | G06T 15/50 345/426 |
| 2004/0207662 A1* | 10/2004 | Anderson | ......... | G06T 17/20 715/848 |
| 2006/0139348 A1* | 6/2006 | Harada | ......... | G06T 17/205 345/419 |
| 2012/0019533 A1* | 1/2012 | Tabellion | ......... | G06T 15/506 345/426 |
| 2012/0182298 A1* | 7/2012 | Sun | ......... | G06T 17/05 345/423 |
| 2013/0127889 A1* | 5/2013 | Winnemoeller | ......... | G06T 17/20 345/582 |
| 2015/0020024 A1* | 1/2015 | Lee | ......... | G06F 3/03545 715/800 |
| 2018/0190016 A1* | 7/2018 | Yang | ......... | G06V 20/56 |

FOREIGN PATENT DOCUMENTS

JP  07-65194 A  3/1995

\* cited by examiner

*Primary Examiner* — Kent W Chang
*Assistant Examiner* — Jonathan M Cofino
(74) *Attorney, Agent, or Firm* — Canon U.S.A., Inc. IP Division

(57) ABSTRACT

An information processing apparatus that generates an image to be displayed, based on shape data indicating a shape of an object and surface characteristics data indicating surface characteristics of the object includes an acquisition unit configured to obtain a plurality of pieces of the shape data with different resolutions and the surface characteristics data, a setting unit configured to set a display area including at least part of the object, and a generation unit configured to generate the image to be displayed, based on one of the plurality of pieces of shape data according to the display area and the surface characteristics data.

13 Claims, 6 Drawing Sheets

ACHIEVING HIGH-DEFINITION EXPRESSION OF A SURFACE OF AN OBJECT AND REDUCTION OF IMAGE-GENERATION TIME

BACKGROUND

Field of the Disclosure

The present disclosure relates to a technique for displaying an image for checking the surface of an object.

Description of the Related Art

Internet shopping has recently become common, which has increased users determining whether to purchase products after checking product information with information technology (IT) devices, such as computers and smartphones. In checking product information, an image obtained by rendering shape data on the product is displayed. A heavy processing load of the rendering may cause a delay of image generation from user's instructions. Japanese Patent Laid-Open No. 07-65194 discloses a technique for high-speed image generation by generating a larger amount of image data on an attention area relative to the amount of image data on a non-attention area.

However, the technique of Japanese Patent Laid-Open No. 07-65194 causes all the displayed areas to become attention areas depending on the display range specified by the user, which makes it difficult to reduce the time for image generation.

SUMMARY

Some embodiments provide a process for achieving both of high-definition expression of the surface of an object and reduction of image generation time in displaying an image for checking the surface of the object.

An information processing apparatus according to some embodiments is an information processing apparatus that generates an image to be displayed, based on shape data indicating a shape of an object and surface characteristics data indicating surface characteristics of the object. The apparatus includes an acquisition unit configured to obtain a plurality of pieces of the shape data with different resolutions and the surface characteristics data, a setting unit configured to set a display area including at least part of the object, and a generation unit configured to generate the image to be displayed, based on one of the plurality of pieces of shape data according to the display area and the surface characteristics data.

Further features of various embodiments will become apparent from the following description of exemplary embodiments with reference to the attached drawings.

DESCRIPTION OF THE EMBODIMENTS

Embodiments will be described hereinbelow with reference to the drawings. These embodiments do not necessarily limit every embodiments. Not all combinations of the characteristics described in the embodiments are absolutely necessary for every embodiment.

First Embodiment

When checking the shape of the object and the appearance of its material, the user zooms in or out, rotates, and translates the object by giving instructions using an input device so that an attention area is displayed. If shape data includes surface characteristics data to express the appearance of the material, the processing load of generating an image is heavy. This may cause a delay of image generation from user's instructions. Thus, this embodiment determines whether to use high-resolution shape data or low-resolution shape data in image generation on the basis of information indicating the object display range. Using low-resolution shape data in image generation when the user pays attention to the appearance of the material allows reducing the time for image generation while expressing the appearance of the material at high definition.

<Hardware Configuration of Information Processing Apparatus>

Figure 1:
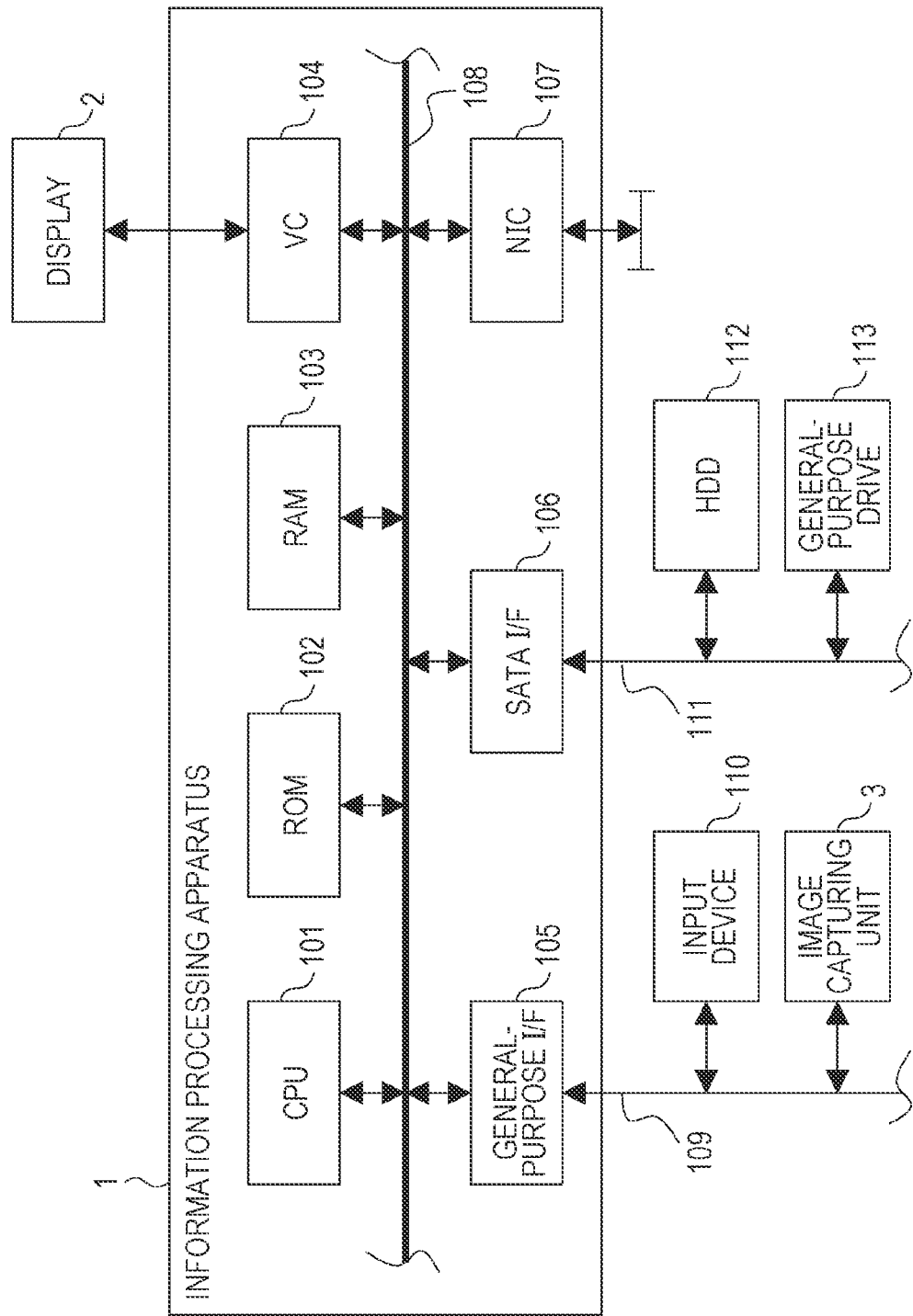
FIG. 1 is a block diagram illustrating the hardware configuration of an information processing apparatus according to an embodiment.

The hardware configuration of an information processing apparatus 1 according to this embodiment will be described with reference to FIG. 1. In FIG. 1, the information processing apparatus 1 includes a central processing unit (CPU) 101, a read only memory (ROM) 102, and a random-access memory (RAM) 103. The information processing apparatus 1 further includes a video card (VC) 104, a general-purpose interface (I/F) 105, a serial advanced technology attachment SATA (serial ATA) I/F 106, and a network interface card (NIC) 107.

The CPU 101 executes an operating system (OS) and various programs stored in the ROM 102 or a hard disk drive (HDD) 112 using the RAM 103 as a work memory. The CPU 101 controls the individual components via a system bus 108. The processing in the flowchart described later is executed by the CPU 101 according to program codes, which are stored in the ROM 102 or the HDD 112, expanded in the RAM 103. The VC 104 connects to a display 2. The general-purpose I/F 105 is connected to an input device 110, such as a mouse or a key board, and an image capturing apparatus 3 via a serial bus 109. The SATA I/F 106 is connected to the HDD 112 and a general-purpose drive 113 that reads and writes data from and to various storage media via a serial bus 111. The NIC 107 receives and outputs information from and to an external device. The CPU 101 uses the HDD 112 and various storage media mounted to the general-purpose drive 113 as storages for various data. The CPU 101 displays a graphical user interface (GUI) provided according the programs on the display 2 and receives user's instructions received via the input device 110 as inputs.

<Functional Configuration of Information Processing Apparatus>

Figure 2:
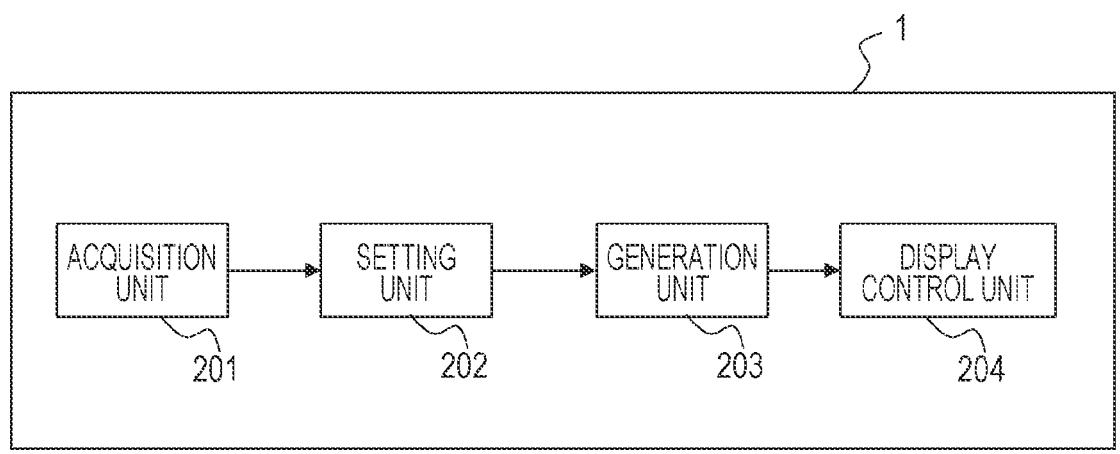
FIG. 2 is a block diagram illustrating the functional configuration of the information processing apparatus.

FIG. 2 is a block diagram illustrating the functional configuration of the information processing apparatus 1. The CPU 101 functions as the functional configuration shown in FIG. 2 by executing programs stored in the ROM 102 or the HDD 112 using the RAM 103 as a work memory. Not all of the following processes need not be executed by the CPU 101. The information processing apparatus 1 may be configured such that part or all of the processes are performed by one or a plurality of processing circuits other than the CPU 101.

Figure 4:
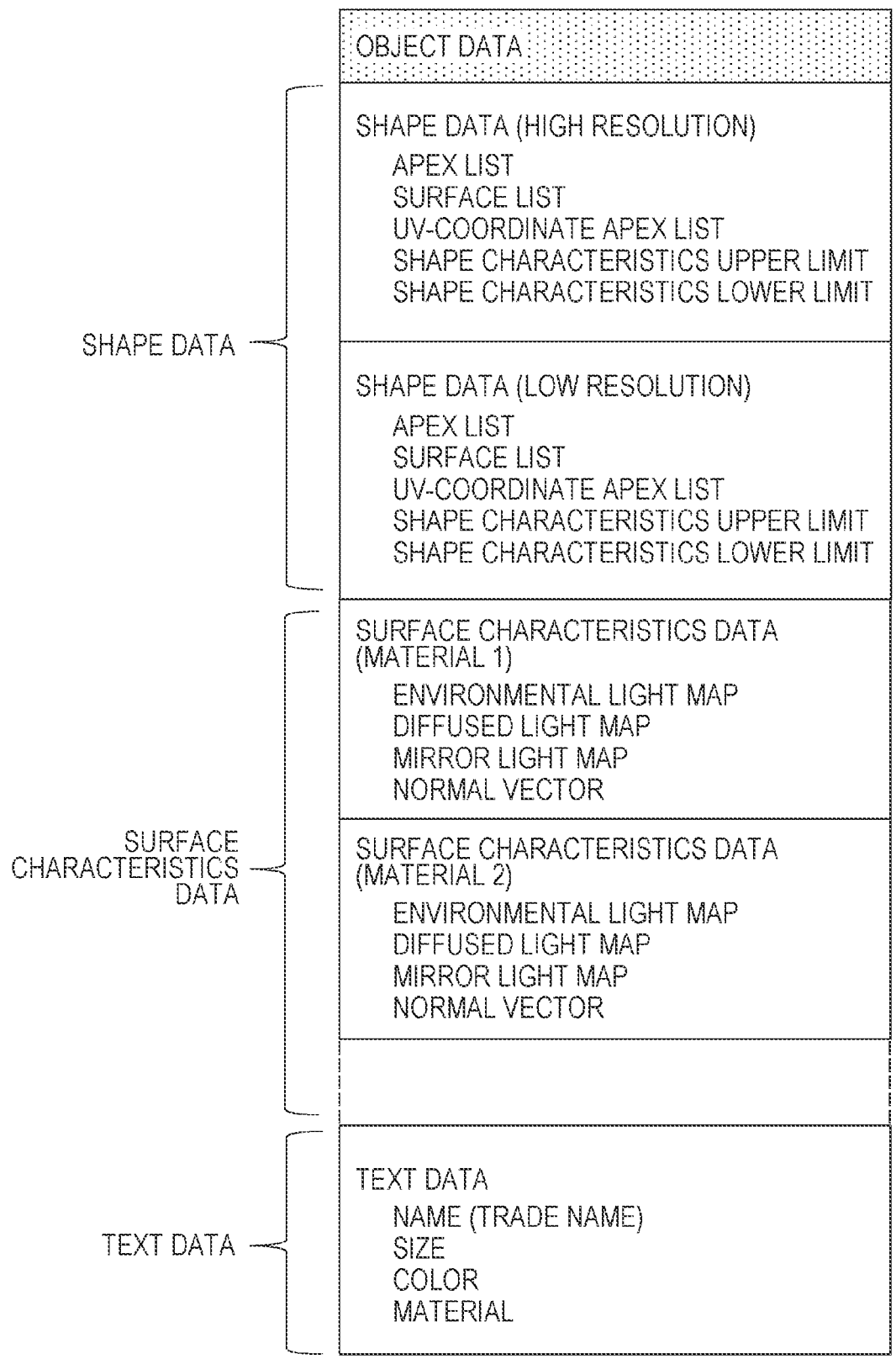
FIG. 4 is a diagram illustrating the structure of object data.

The information processing apparatus 1 includes an acquisition unit 201, a setting unit 202, a generation unit 203, and a display control unit 204. The acquisition unit 201 obtains object data from a storage device, such as the HDD 112, according user's instructions. FIG. 4 illustrates the structure of the object data. The object data contains two kinds of shape data, surface characteristics data on each material, and text data. The two kinds of shape data include high-resolution shape data and low-resolution shape data. The high-resolution shape data indicates a shape approximated to the shape of the object using many polygons to express a detailed shape. The low-resolution shape data is shape data obtained by decreasing the resolution of the high-resolution shape data. Each shape data is polygon data containing an apex list, a surface list, a UV-coordinate apex list, a shape characteristics upper limit, and a shape characteristics lower limit. The apex list is a list of sets of the coordinates of the apexes of polygons. The surface list is a list of sets of counterclockwise descriptions of three apexes constituting a surface, with respect to the normal of the surface. The UV-coordinate apex list is a list of the coordinates of the apexes of polygons in the UV coordinate system. The UV coordinate system is a two-dimensional coordinate system in which a polygon group is expanded in a plane to map the surface characteristics data on the polygon surface. The shape characteristics upper limit and the shape characteristics lower limit are values that define the use range of the shape data. Specifically, the shape characteristics value is the error sum of squares obtained by performing plane fitting on the apexes of polygons included in the shape within the rendering range. A high shape characteristics value indicates that the shape in the rendering range is an uneven complicated shape. A low shape characteristics value indicates that the shape in the rendering range is a nearly planer shape with few features.

The surface characteristics data indicates the surface characteristics of the object and includes an environmental light map, a diffused light map, a mirror light map, and a normal vector map. The environmental light map, the diffused light map, the mirror light map, and the normal vector map are described in the UV coordinate system. The surface characteristics data of this embodiment indicates surface characteristics that are expressed on the basis of Phong reflection model.

The text data stores detailed information on the object, name (trade name), size, color, and material. The setting unit 202 sets image display conditions. The generation unit 203 generates an image by performing rendering based on the object data.

Figure 3:
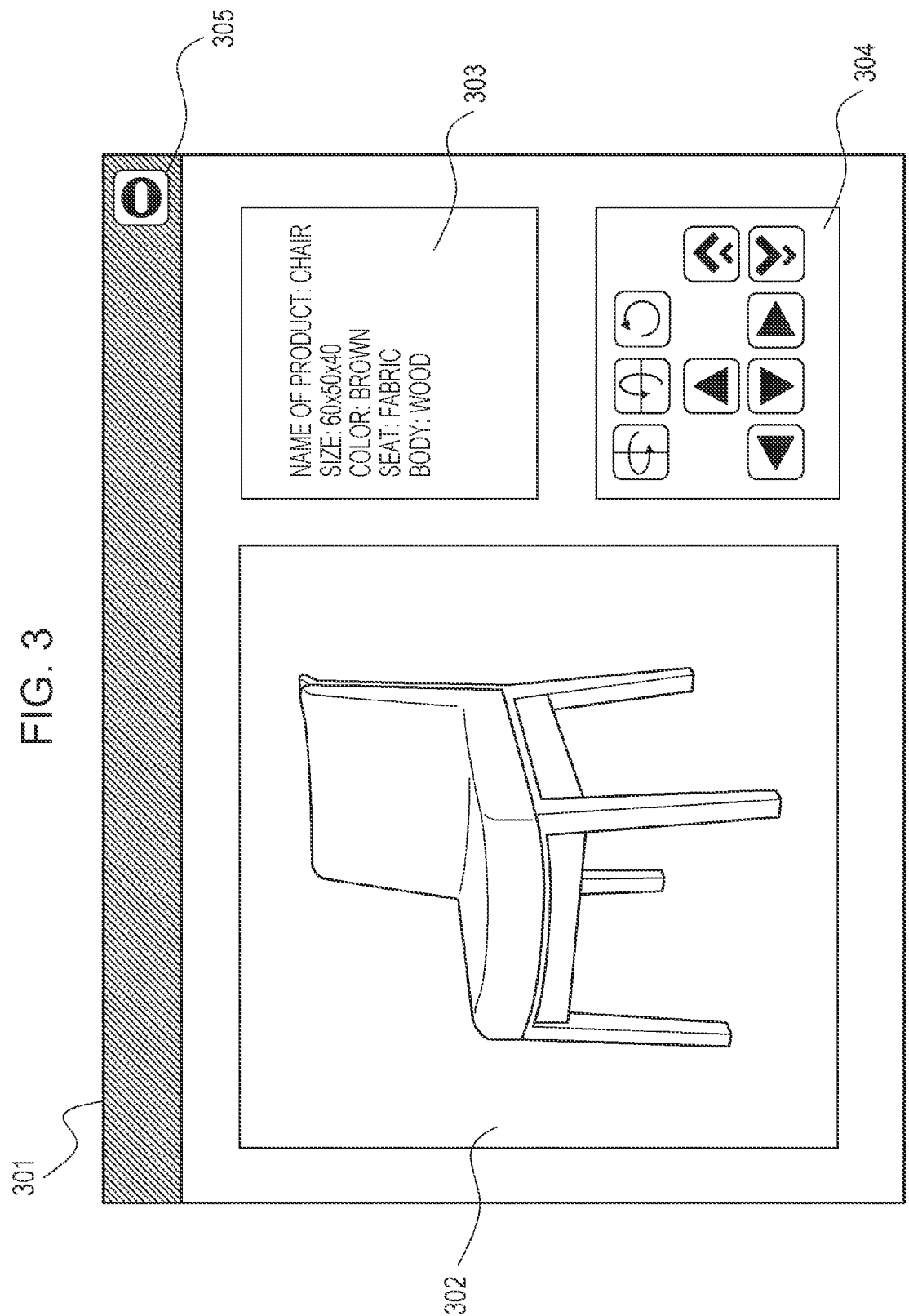
FIG. 3 is a diagram illustrating an example of a user interface.

The display control unit 204 displays a user interface (UI) for receiving user's instructions and a generated image on the display 2. FIG. 3 is a diagram illustrating an example of the UI. The UI 301 includes an image display area 302, a text display area 303, an instruction area 304, and an exit button 305. The image display area 302 displays a generated image. The text display area 303 displays the size and the material of the object. When Zoom-in or Zoom-out button, Rotation button, or Translation button is pressed in the instruction area 304, the object in the image displayed in the image display area 302 is zoomed in or out, rotated, or translated.
<Processing that Information Processing Apparatus Executes>

Figure 5:
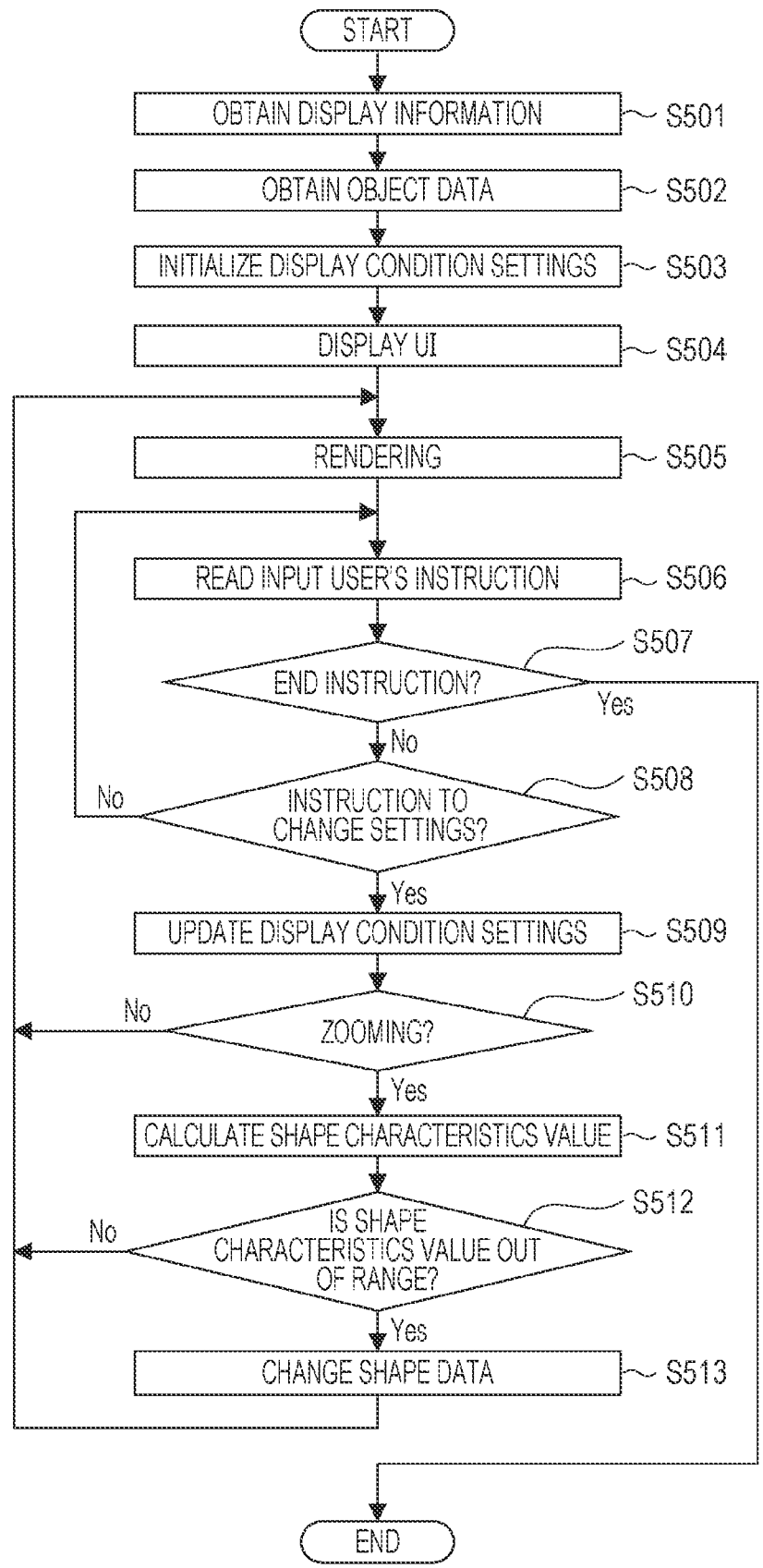
FIG. 5 is a flowchart illustrating processing that the information processing apparatus executes.

FIG. 5 is a flowchart illustrating processing that the information processing apparatus 1 executes. The individual operations (processes) are each denoted by reference number headed by S. At S501, the acquisition unit 201 obtains display information on the display 2 from a storage device, such as the HDD 112, and stores the information in the RAM 103. The display information indicates the resolution, the number of vertical and horizontal pixels, and so on of the display 2. At S502, the acquisition unit 201 obtains object data from the storage device, such as the HDD 112, on the basis of user's instructions.

At S503, the setting unit 202 initializes image display conditions. Specifically, the setting unit 202 sets the image display area 302 so that the whole object is displayed in the image display area 302. To display the whole object, high-resolution shape data is set as shape data for use in generating an image. The setting unit 202 sets a global orthogonal coordinate system and disposes the center of the object at the origin of the global orthogonal coordinate system. The setting unit 202 disposes a virtual camera on the X-axis of the global orthogonal coordinate system as a viewpoint. A predetermined value is set for the angle of view of the virtual camera. The virtual camera is disposed at a position on the X-coordinate so that the whole object is within the angle of view. The angle of view of the virtual camera in this embodiment is set at 40 degrees. The degree of zooming depends on the X-coordinate of the virtual camera. The setting unit 202 initializes the rotation angles of the X-axis, the Y-axis, and the Z-axis of the object to zero. The number of pixels of the virtual camera is set on the basis of the number of pixels assigned to the image display area 302 out of the number of pixels of the display 2 indicated by the display information. A virtual light source is disposed at a predetermined position so as not to be aligned with the object.

At S504, the display control unit 204 displays the UI 301 on the display 2. The size of the UI 301 is determined on the basis of the display information. In this case, the generation unit 203 performs rendering based on the text data, and a text, which is the result of rendering, is displayed in the text display area 303. At S505, the generation unit 203 performs rendering using one shape data and surface characteristics data on the basis of the set image display conditions to generate an image. Specifically, the generation unit 203 determines coordinate values of the apex in the global orthogonal coordinate system from the coordinate values in the apex list in the shape data. The generation unit 203 generates a conversion matrix for perspective transformation based on the positions of the object and the virtual camera and the pixel data on the virtual camera to convert the shape data in the global orthogonal coordinate system to data in a viewing coordinate system. The generation unit 203 calculates the distances from the virtual camera to the individual polygons and performs hidden surface removal for leaving only the surfaces on this side. The generation unit 203 maps the surface characteristics data in the UV-coordinates of the shape data subjected to hidden surface removal. The generation unit 203 generates an image by performing rendering using the Phong reflection model on the basis of the normal vectors of the polygons, calculated from the apex coordinate list and the surface list, the eye vectors from the virtual camera to the polygons, and the maps in the surface characteristics data. The generated image is displayed in the image display area 302 by the display control unit 204.

At S506, the acquisition unit 201 reads an input user's instruction. At S507, the acquisition unit 201 determines whether the input user's instruction is an instruction to exit.

If the user's instruction is an instruction to exit given by pressing of the exit button 305, the UI 301 is deleted, and the processing ends.

At S508, the acquisition unit 201 determines whether the user's instruction is an instruction to change the settings of display conditions. If the user's instruction is a change instruction given by pressing of a button in the instruction area 304, then at S509, the setting unit 202 updates the settings of display conditions. The setting unit 202 moves the virtual camera in the front-back direction on the X-coordinate and rotates the virtual camera in the X-axis direction, the Y-axis direction, and the Z-axis direction. The update of the settings changes the object display area. If the user's instruction is not an instruction to change the settings, the processing returns to the reading of the instruction at S506.

At S510, the acquisition unit 201 determines whether the user's instruction is a zooming instruction (to change the display range). If the user's instruction is a zooming instruction, then at S511, the setting unit 202 calculates the shape characteristics value of the object in the changed display area.

Specifically, the setting unit 202 calculates, as a shape characteristics value, the error sum of squares obtained by performing plane fitting on the apexes of polygons included in the object in the display area. The setting unit 202 performs perspective transformation and hidden surface removal, which are used in rendering, to extract generated polygons. The apexes of the extracted polygons are subjected to plane fitting using a least-squares method to derive the least square error as a shape characteristics value.

At S512, the setting unit 202 determines whether the calculated shape characteristics value is included in the range determined by the shape characteristics upper limit and the shape characteristics lower limit corresponding to the shape data used in generating the displayed image. If the calculated shape characteristics value is out of the range, then at S513, the setting unit 202 updates the shape data. Specifically, the setting unit 202 changes the set shape data to shape data in which the calculated shape characteristics value is within the range. If the user's instruction is not a zooming instruction, if the calculated shape characteristics value is within the range, and if the shape data is updated, the processing returns to the rendering process at S505.

The newly generated image is displayed in the image display area 302 by the display control unit 204.

<Advantageous Effect of First Embodiment>

As described above, the information processing apparatus 1 of this embodiment obtains a plurality of pieces of shape data with different resolutions and surface characteristics data to set a display area including at least part of the object. The information processing apparatus 1 generates the image to be displayed on the basis of at least one piece of shape data according to the display area among the plurality of pieces of shape data and the surface characteristics data. This allows achieving both of high-definition expression of the surface and reduction of image generation time in displaying an image for checking the surface of the object.

Suppose that the object is a commercial product. If the user has interest in the overall shape or the decorative portion of the product, the product displayed in the image display area 302 has uneven complicated shape, consequently with a high shape characteristics value. In this case, high-resolution shape data indicating the characteristics of the shape in detail is used for rendering. Even if rendering is performed using surface characteristics data with decreased resolution to reduce the time of rendering, the quality indicated by the surface characteristics has little influence on the recognition of the user because the user pays attention to the shape of the product. If the user pays attention to the appearance of the material of the product (gives an instruction to zoom in), the product displayed in the image display area 302 has a simple shape with few irregularities, consequently with a low shape characteristics value. In this case, low-resolution shape data is used for rendering, which reduces the time for rendering. Furthermore, since the user pays attention to the appearance of the material, the resolution of the shape of the object has little influence on the recognition of the user. Thus, achieving both of high-definition expression of the surface and reduction of the image generation time allows quick reaction to the user's intention to change the details of the display and allows high-definition display of the target area.

Second Embodiment

In displaying an object in enlarged view, the first embodiment uses low-resolution shape data for rendering. In displaying an object in enlarged view, this embodiment uses low-resolution shape data and high-resolution surface characteristics data for rendering, and in displaying an object in reduced size, uses high-resolution shape data and low-resolution surface characteristics data for rendering. The hardware configuration and the functional configuration of the information processing apparatus 1 of this embodiment are the same as those of the first embodiment, and therefore descriptions thereof will be omitted. The difference between this embodiment and the first embodiment will be mainly described hereinbelow. The same components as those of the first embodiment are denoted by the same reference signs.

<Processing that Information Processing Apparatus Executes>

Figure 6:
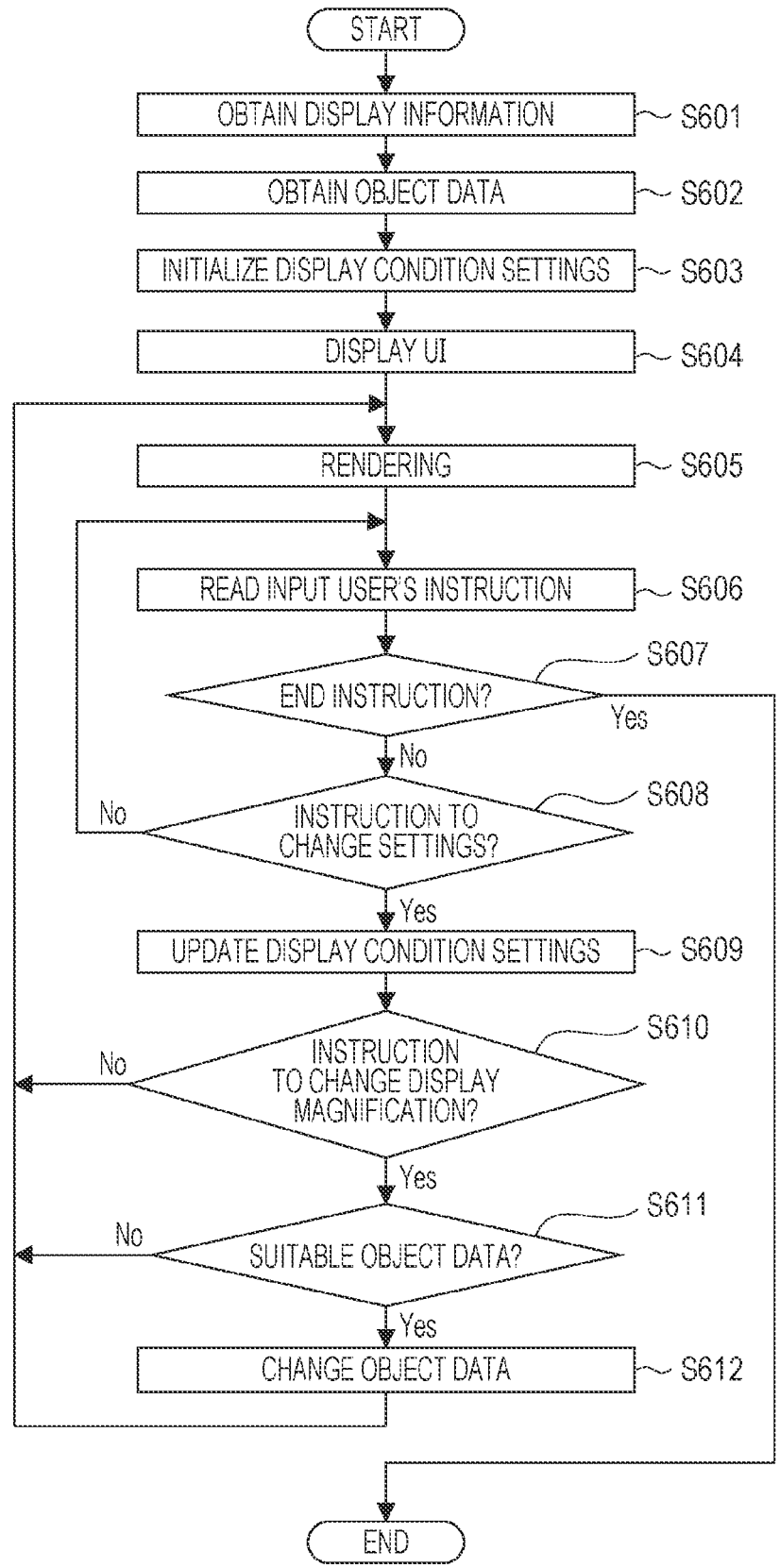
FIG. 6 is a flowchart illustrating processing that the information processing apparatus executes.

FIG. 6 is a flowchart illustrating processing that the information processing apparatus 1 executes. Since the processes S601 and S604 to 609 are the same as those of S501 and S504 to 509 of the first embodiment, descriptions thereof will be omitted. At S602, the acquisition unit 201 obtains two kinds of object data on the basis of user's instructions. The two kinds of object data include object data for use at low display magnification and object data for use at high display magnification. At S603, the setting unit 202 initializes image display conditions. Specifically, the setting unit 202 initializes the display magnification, in addition to the setting process in the first embodiment. At S610, the acquisition unit 201 determines whether the user's instruction is an instruction to change the display magnification.

If the user's instruction is an instruction to change the display magnification, then at S611, the setting unit 202 determines whether the changed display magnification is higher than or equal to the threshold. If the changed display magnification is higher than or equal to the threshold and object data corresponding to high display magnification has been set, then the setting unit 202 determines that object data suitable for the changed display magnification has been set. Also when the changed display magnification is less than the threshold, and object data corresponding to low display magnification has been set, the setting unit 202 determines that object data suitable for the changed display magnification has been set. In contrast, if the changed display magnification is higher than or equal to the threshold, and object data corresponding to low display magnification has been set, then the setting unit 202 determines that object data that is not suitable for the changed display magnification has been set. If the changed display magnification is less than the threshold, and object data corresponding to high display magnification has been set, then the setting unit 202 determines that object data that is not suitable for the changed display magnification has been set.

At S612, the setting unit 202 updates the object data. Specifically, if the changed display magnification is higher than or equal to the threshold, the setting unit 202 sets object data corresponding to high display magnification, and if the changed display magnification is less than the threshold, the setting unit 202 sets object data corresponding to low display magnification.

<Advantageous Effects of Second Embodiment>

As described above, the information processing apparatus 1 of this embodiment switches the object data for use in rendering according to the display magnification. This allows achieving both of high-definition expression of the surface and reduction of image generation time in displaying an image for checking the surface of the object.

Modifications

In the above embodiments, low-resolution shape data is obtained by decreasing the resolution of high-resolution shape data. Alternatively, data indicating a spherical shape may be used as low-resolution shape data regardless of the shape of the object. A spherical shape with large curvature indicated by low-resolution shape data has surfaces in multiple directions with respect to incident light, which makes it easy to recognize the surface characteristics.

The above embodiments select shape data for use in rendering from two kinds of shape data, the high-resolution shape data and the low-resolution shape data. Alternatively, shape data may be selected from three kinds or more of shape data. For example, shape data for use in rendering may be selected from three kinds of shape data with different resolution, such as high resolution, intermediate resolution, and low-resolution shape data.

The surface characteristics data in the above embodiments is data indicating surface characteristic expressed on the basis of the Phong reflection model. Alternatively, the surface characteristics data may be based on a bidirectional reflectance distribution function (BRDF) or another reflection model.

The acquisition unit 201 in the above embodiments obtains object data according to user's instructions. Alternatively, the acquisition unit 201 may obtain predetermined object data.

In the above embodiments, shape data for use in rendering is selected from shape data with different resolutions generated in advance. Alternatively, multiple kinds of shape data with decreased resolutions may be generated by performing down sampling on single shape data.

In the above embodiments, rendering is performed using surface characteristics data for each material. Alternatively, even if multiple materials are present in the display area, only the surface characteristics data on a material at the center of the display area may be mapped on shape data. Only the surface characteristics data on a material having the highest proportion in the display area may be used.

In the first embodiment, only the shape data is updated. Also for the surface characteristics data, the resolution may be decreased according to the time taken for rendering.

In the first embodiment, the error sum of squares obtained by performing plane fitting on the apexes of polygons included in the object in the display area is calculated as a shape characteristics value. The shape characteristics value may be calculated using another method. For example, the dispersion of the inner products of the normal vectors of the polygon surfaces included in the object in the display area and the eye vector of the virtual camera may be calculated as the shape characteristics value. Large dispersion of the inner products of the vectors indicates that the polygon surfaces face in various directions, which shows that the shape of the object in the display area is complicated.

The second embodiment uses one threshold for the display magnification. Alternatively, the threshold to be used may be selected from a plurality of thresholds. For example, the threshold for use in switching from low display magnification to high display magnification may be lower than the threshold for use in switching from high display magnification to low display magnification.

Some embodiments allow achieving both of high-definition expression of the surface and reduction of image generation time in displaying an image for checking the surface of the object.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-183117, which was filed on Oct. 30, 2020 and which is hereby incorporated by reference herein in its entirety.

What is claimed is:

1. An information processing apparatus comprising:
one or more processors that are configured to:
receive a zoom-in display instruction or a zoom-out display instruction for setting a display area including at least part of an object;
generate, in a case where the zoom-in display instruction is received, an image corresponding to the display area based on first shape data indicating a shape of the object and first surface characteristic data indicating a surface characteristic of the object; and generate, in a case where the zoom-out display instruction is received, an image corresponding to the display area based on second shape data with resolution higher than resolution of the first shape data and second surface characteristic data with resolution lower than resolution of the first surface characteristic data.

2. The information processing apparatus according to claim 1, wherein, to generate the image corresponding to the display area, in a case where the display area is a first display area, the one or more processors are further configured to use the second shape data, and in a case where the display area is a second display area smaller than the first display area, the one or more processors are further configured to use the first shape data.

3. The information processing apparatus according to claim 1, wherein the one or more processors are further configured to set the display area based on the zoom-in display instruction or the zoom-out display instruction from a user.

4. The information processing apparatus according to claim 1, wherein the first surface characteristic data or the second surface characteristic data includes at least one of the following: an environmental light map, a diffused light map, and a mirror light map.

5. The information processing apparatus according to claim 1, wherein the first surface characteristic data or the second surface characteristic data indicates the surface characteristic expressed based on a reflection model.

6. The information processing apparatus according to claim 1,
wherein the one or more processors are further configured to determine whether a value indicating shape characteristics of the object in the display area is within a range according to the shape data, and
wherein the one or more processors are further configured to determine shape data for use for the image corresponding to the display area based on a result of the determination.

7. The information processing apparatus according to claim 1, wherein the one or more processors are further configured to set the display area based on an instruction for display magnification from a user.

8. The information processing apparatus according to claim 7,
wherein the one or more processors are further configured to determine whether the display magnification is higher than or equal to a threshold, and
wherein the one or more processors are further configured to determine shape data for use for the image corresponding to the display area based on a result of the determination.

9. The information processing apparatus according to claim 1, wherein the one or more processors are further configured to obtain surface characteristic data for each of materials included in the object.

10. The information processing apparatus according to claim 1, wherein the one or more processors are further configured to display the image corresponding to the display area on a display.

11. The information processing apparatus according to claim 1, wherein the one or more processors are further configured to generate the first shape data by performing processing for decreasing resolution of the second shape data, and to generate the second surface characteristic data by performing processing for decreasing resolution of the first surface characteristic data.

12. An information processing method comprising:

receiving a zoom-in display instruction or a zoom-out display instruction for setting a display area including at least part of an object;

generating, in a case where the zoom-in display instruction is received, an image corresponding to the display area based on first shape data indicating a shape of the object and first surface characteristic data indicating a surface characteristic of the object; and generating, in a case where the zoom-out display instruction is received, an image corresponding to the display area based on second shape data with resolution higher than resolution of the first shape data and second surface characteristic data with resolution lower than resolution of the first surface characteristic data.

13. A non-transitory computer-readable storage medium storing instructions that, when executed by a computer, cause the computer to perform an information processing method, the information processing method comprising:

receiving a zoom-in display instruction or a zoom-out display instruction for setting a display area including at least part of an object;

generating, in a case where the zoom-in display instruction is received, an image corresponding to the display area based on first shape data indicating a shape of the object and first surface characteristic data indicating a surface characteristic of the object; and generating, in a case where the zoom-out display instruction is received, an image corresponding to the display area based on second shape data with resolution higher than resolution of the first shape data and second surface characteristic data with resolution lower than resolution of the first surface characteristic data.

* * * * *